United States Patent
Wochner et al.

(10) Patent No.: US 7,736,439 B2
(45) Date of Patent: Jun. 15, 2010

(54) METHOD FOR CLEANING A POLYSILICON FRACTION

(75) Inventors: Hanns Wochner, Burghausen (DE); Christian Gossmann, Emmerting (DE); Herbert Lindner, Ostermiething (AT)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 11/764,246

(22) Filed: Jun. 18, 2007

(65) Prior Publication Data

US 2008/0006293 A1    Jan. 10, 2008

(30) Foreign Application Priority Data

Jul. 5, 2006    (DE)    ........................ 10 2006 031 105

(51) Int. Cl.
    *C23G 1/02*    (2006.01)
(52) U.S. Cl. .............................. 134/2; 134/3; 134/25.4; 134/26; 134/28; 134/32; 134/33; 134/35; 134/36; 134/41; 134/42; 134/902
(58) Field of Classification Search .................... 134/2, 134/3, 26, 25.4, 28, 32, 33, 35, 36, 41, 42, 134/902
    See application file for complete search history.

(56) References Cited

U.S. PATENT DOCUMENTS

| 5,445,679 | A | * | 8/1995 | Hansen et al. .................. 134/1 |
| 5,466,641 | A | * | 11/1995 | Shimizu et al. ............. 438/166 |
| 5,753,567 | A | * | 5/1998 | Banan et al. ................. 438/720 |
| 5,846,921 | A | | 12/1998 | Gil et al. |
| 5,851,303 | A | * | 12/1998 | Hwang et al. .................. 134/3 |
| 6,309,467 | B1 | | 10/2001 | Wochner et al. |
| 6,369,008 | B1 | | 4/2002 | Ha et al. |
| 2003/0124779 | A1 | * | 7/2003 | Seo et al. .................... 438/151 |
| 2004/0045574 | A1 | * | 3/2004 | Tan ................. 134/1 |
| 2006/0070569 | A1 | * | 4/2006 | Andrejewski et al. ......... 117/13 |

FOREIGN PATENT DOCUMENTS

| DE | 195 29 518 A1 | 2/1996 |
| DE | 198 17 486 A1 | 1/1999 |
| JP | 05-004811 | * 1/1993 |
| JP | 11-176784 | 7/1999 |
| WO | WO03105209 A1 * 12/2003 |

OTHER PUBLICATIONS

Patent Abstract corresponding to JP 11-176784.
Patbase abstract corresponding to DE 195 29 518 A1.
US 5,846,921 is corresponding to DE 198 17 486 A1.

* cited by examiner

*Primary Examiner*—Sharidan Carrillo
(74) *Attorney, Agent, or Firm*—Brooks Kushman P.C.

(57) ABSTRACT

The present invention relates to a method for cleaning polycrystalline silicon fragments to a metal content of <100 ppbw, wherein a polysilicon fraction is added to an aqueous cleaning solution containing HF and $H_2O_2$, this aqueous cleaning solution is removed and the polycrystalline fraction thereby obtained is washed with highly pure water and subsequently dried.

Figure 1:
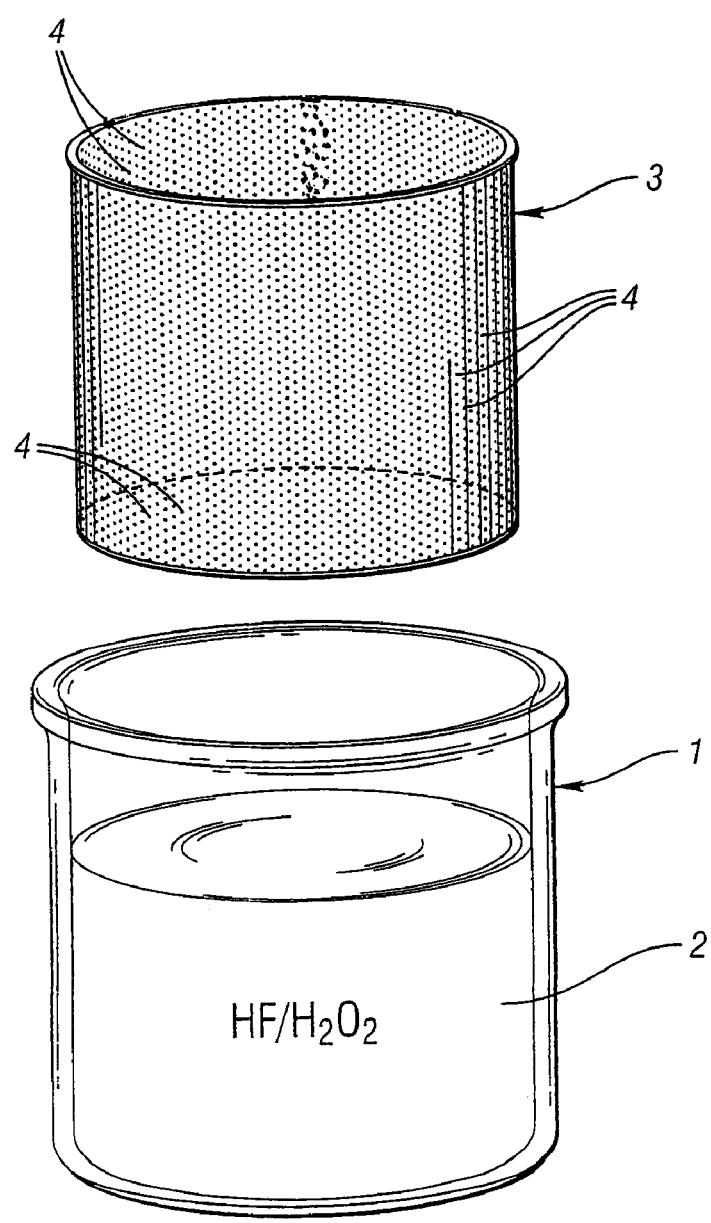

20 Claims, 1 Drawing Sheet

METHOD FOR CLEANING A POLYSILICON FRACTION

BACKGROUND OF THE INVENTION

1. Field of the Invention

The invention relates to a method for cleaning a polysilicon fraction.

2. Background Art

Highly pure polycrystalline silicon, referred to below as polysilicon, is produced on a large scale by thermal decomposition of a gas containing silicon or a gas mixture containing silicon in so-called Siemens reactors. The polysilicon is thereby created in the form of rods. These rods are subsequently comminuted with metal breaking tools such as jaw or ball crushers, hammers or chisels. This leads to superficial contamination of the polysilicon fragments. This contamination, and in particular any metal contamination, must be removed before the polysilicon fragments are processed further since they are unacceptable in the starting material for the production of electronic components and solar cells, for which the polysilicon fraction is generally used.

U.S. Pat. No. 6,309,467 B1 describes at length the prior art for cleaning polysilicon fragments and discloses a three-stage cleaning method for polysilicon, which subsequently has a very low iron and/or chromium content. With this method, the cleaning is carried out successively in a plurality of chemical treatment steps. Multistage cleaning methods require systems having a plurality of vessels, which are correspondingly elaborate. The method described in U.S. Pat. No. 6,309,467 B1 for cleaning a finely divided polysilicon fraction is disadvantageously also associated with a high consumption of acid and a high silicon loss. Furthermore, elaborate cooling is needed for cleaning a finely divided polysilicon fraction.

SUMMARY OF THE INVENTION

It was an object of the present invention to provide a method for cleaning polycrystalline silicon fragments to a metal content of <100 ppbw, preferably <10 ppbw, which avoids the disadvantages of the prior art. These and other objects are achieved by a method wherein a polysilicon fraction is added to an aqueous cleaning solution containing HF and $H_2O_2$, this aqueous cleaning solution is removed and the polycrystalline fraction thereby obtained is washed with highly pure water and subsequently dried.

BRIEF DESCRIPTION OF TUE DRAWINGS

FIG. 1 illustrates an apparatus suitable for use in the invention in schematic form.

DETAILED DESCRIPTION OF THE PREFERRED EMBODIMENT(S)

The aqueous solution containing HF and $H_2O_2$ preferably consists of from 0.1 to 60 wt. % HF and from 0.1 to 50 wt. % $H_2O_2$, and the remainder to 100 wt. % of $H_2O$. The wt. % specifications refer to the entire cleaning solution.

The solution more preferably consists of from 5 to 10 wt. % HF and from 1 to 2 wt. % $H_2O_2$ in $H_2O$. The aqueous solution containing $HF/H_2O_2$ is particularly economical for the following reasons: it attacks metallic contamination, in particular steel particles, strongly, but does not attack silicon. At the same time, in contrast to an $HCl/HF/H_2O_2$ mixture or the mixture $HCl/H_2O_2$ of the prior art, this cleaning solution does not exhibit any auto-decomposition of hydrogen peroxide into water and oxygen. The $H_2O_2$ consumption in the method is therefore reduced by about 99%. Replenishment of $H_2O_2$ is not necessary in the method. The undesired development of heat, which occurs owing to the auto-decomposition of hydrogen peroxide, is furthermore avoided.

Preferably, the polysilicon fraction is added to the aqueous cleaning solution for from 5 to 240 min, more preferably from 20 to 45 min, most preferably 40 min.

Preferably, the polycrystalline fraction in a container which has openings is immersed into the cleaning liquid, cleaning liquid flowing through the openings into the container and wetting the polycrystalline silicon, then the container is raised out of the liquid until the cleaning liquid can flow out through the openings of the container.

Preferably, the polysilicon fraction in a container, preferably a basket, is immersed into the cleaning liquid at least twice by means of a raising and lowering movement. Preferably, the raising and lowering movements are configured so that the container can be fully emptied when it is raised out of the cleaning solution, the cleaning solution flowing out fully. Preferably, the raising and lowering movement is carried out 5 times per minute for up to 240 minutes, more preferably up to 40 minutes.

In principle, the cleaning may even take place without moving the container in the individual cleaning steps. Besides the raising-lowering movement, as an alternative a seesaw movement may also take place with from 1 to 10 movements per minute at an angle of from 5 to 89 degrees or a rotary movement with from 1 to 10 revolutions per minute. The seesaw movement preferably takes place with 1 movement per minute and an angle of 45 degrees. The rotary movement is preferably performed at 1 revolution per minute.

The cleaning solution is subsequently removed and the polysilicon fraction is washed for from 1 to 240 min with highly pure water, preferably fully deionized water having an electrical resistivity of 1-18 Mohm. The polysilicon fraction is preferably washed for from 15 to 35 min, more particularly preferably for 20 min.

The cleaning and washing steps are preferably carried out at standard pressure and room temperature (25° C.), the cleaning method preferably being performed at from 5° C. to 80° C. and more particularly preferably at from 20° C. to 25° C.

The polysilicon fraction is subsequently dried. The drying is preferably carried out over a period of from 0.5 to 3 h at a temperature of from 50 to 100° C.

The polysilicon fraction may in principle be dried in any drying system. For drying in a drying oven at 80 degrees Celsius, 24 hours are required. This time can be reduced to less than 2 hours by other drying methods. Such methods are, for example, drying in a drum drying system or drying in a system with forced through-flow or drying in layers with a bed height of at most 5 cm.

Although the method according to the invention is suitable in principle for cleaning any polysilicon fragments as well as for cleaning polysilicon granules, it is however suitable particularly for cleaning finely divided polysilicon fragments since the silicon is not attacked by the cleaning solution. It avoids the enhanced loss of silicon due to the increased silicon surface area of more finely divided powders, which occurs with other cleaning solutions. Additional cooling, which would be necessary when dissolving the silicon, is furthermore avoided. The method according to the invention is therefore preferably suitable for cleaning polysilicon fragments with a maximum particle diameter of about 50 mm, more preferably a maximum particle diameter of about 25 mm, and most more preferably a maximum particle diameter of from 10 μm to 10 mm.

The container in which the method according to the invention is carried out may consist of an inexpensive plastic, for example polypropylene, while conventional methods have to be carried out in containers made of expensive plastics such as polyvinylidene fluoride or Teflon/PTFE.

The method may be carried out in principle in a raising/lowering system, drum system or seesaw system with a plurality of vessels, which are arranged in series. Preferably, however, it is carried out in a single vessel in which the various media (HF/$H_2O_2$ and wash water) are supplied from different containers.

This may, for example, be done in a commercially available autoclave etching system. In this system the cleaning, washing and drying take place in a one-chamber system. Such a system entails a much lower space requirement compared with a raising/lowering system.

The method according to the invention makes it possible to clean a polysilicon fraction strongly contaminated with iron and chromium to an iron and chromium content of less than 100 ppbw, preferably less than 10 ppbw. Such polysilicon with an iron and chromium content of less than 10 ppbw is preferably used in the solar industry. A polysilicon fraction with an iron and chromium content of less than 100 ppbw is also desirable, since these materials can be added to qualitatively superior material in pulling processes. The method is much more cost-effective than known methods for cleaning a polysilicon fraction.

FIG. 1 shows in schematic form one embodiment of an apparatus used in the present process. Container 1 contains an aqueous cleaning solution 2 of HF and $H_2O_2$. Basket 3 contains numerous holes 4 which allow the aqueous cleaning solution to enter and flow out of the basket as it is respectfully lowered into and raised out of the aqueous cleaning solution.

The following examples serve to explain the invention further.

Example 1

According to the Invention 30 kg of a polysilicon fraction with a particle diameter of from 10 to 10,000 μm and superficial contamination with 1 ppm of Fe, such as occurs when breaking a polysilicon rod by means of a conventional breaking system, are put into a process bowl with a lid. 600 l of a mixture of 10 wt. % HF and 2 wt. % $H_2O_2$ in water are subsequently put into the process bowl and the lid is closed. During the cleaning, the process bowl performs a raising/lowering movement with a frequency of 5 strokes per minute. After 20 or 40 minutes of acid treatment, the acid is discharged and the polysilicon fraction is subsequently washed with cold ultrapure water for 5 min. After washing with warm water at 80 degrees, the material is dried at 80 degrees for 24 hours in a drying oven.

Example 2

Comparative Example 30 kg of a polysilicon fraction with a particle diameter of from 10 to 10,000 μm were cleaned similarly as in Example 1, a mixture of 5 wt. % HF, 10 wt. % HCl and 1.5 wt. % $H_2O_2$ in water now being used instead of the mixture of 10 wt. % HF and 2 wt. % $H_2O_2$ in water.

Example 3

The contamination of the surfaces of the cleaned silicon powder obtained according to Ex. 1 and Ex. 2 was determined as described in U.S. Pat. No. 6,309,467 B1 at the end of Ex. 3. Table 1 reports the values found as well as the yield of cleaned Si and the respective specific acid consumption (g of acid/kg of Si).

TABLE 1

| Medium | Cleaning time [min] | Fe [ppbw] | Cr [ppbw] | Ni [ppbw] | Yield in % | specific acid consumption in g/kg |
|---|---|---|---|---|---|---|
| HF/$H_2O_2$(i) | 20 | 15 | 1 | 0.5 | 99.9 | 0.001 |
| HF/$H_2O_2$(i) | 40 | 5 | 0.5 | 0.2 | 99.9 | 0.002 |
| HF/HCl/$H_2O_2$(c) | 20 | 15 | 1 | 0.5 | 99 | 0.2 |
| HF/HCl/$H_2O_2$(c) | 40 | 5 | 0.5 | 0.2 | 98 | 0.4 |

(c) comparative example;
(i) example according to the invention.

The results show that the results obtained by the inventive process are as good as those achieved by cleaning according to the prior art. Advantageously with the method according to the invention, however, no loss of silicon takes place so that the yields of cleaned Si can be greatly increased, particularly in the case of fine powders with a large surface area. The 0.1% loss of silicon when cleaning with HF/$H_2O_2$ occurs only by the ejection of fine Si dust. When cleaning with HF/HCl/$H_2O_2$, the loss occurs by fine dust ejection and the amount of silicon dissolved, which is incurred by the 0.1 μm etching erosion. While a material with an iron and chromium content of <10 ppbw, which fulfills all requirements, can be obtained with a cleaning time of 40 minutes by the method according to the invention, a method with a shorter cleaning time (between 5 and 40 min) is also advantageous since such a material with less than 100 ppbw of contamination has a sufficient quality for various applications.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for removing metal impurities from a polycrystalline silicon fraction containing small fragments of polycrystalline silicon derived from crushing rods of polysilicon, without dissolving the polycrystalline silicon, consisting of the steps of:

removing metal impurities by contacting a polycrystalline silicon fraction at least once with an aqueous cleaning solution consisting essentially of water and metal removing reagents consisting essentially of from about 5 to about 10 weight percent HF, and from about 1 to about 2 weight percent $H_2O_2$, wherein said aqueous cleaning solution does not etch the polycrystalline silicon, removing the aqueous cleaning solution, and washing the polycrystalline silicon fraction thereby obtained with highly pure water having an electrical resistivity of from 1 MΩ to 18 MΩ, to form a washed polycrystalline silicon fraction, and drying the washed polycrystalline silicon fraction thereby obtained to obtain a dry polycrystalline silicon fraction having metal impurities of less than 100 ppbw, wherein the polycrystalline silicon fraction has polycrystalline silicon fragments with a maximum particle size in the range of 10 μm to about 25 mm and wherein an additional washing of the polycrystalline silicon fraction with said highly pure water may take place prior to drying the washed polycrystalline silicon fraction.

2. The method of claim 1, wherein the polycrystalline silicon fraction is added to the aqueous cleaning solution for from 5 to 240 min.

3. The method of claim 1, wherein the polycrystalline silicon fraction is added to the aqueous cleaning solution for from 20 to 45 min.

4. The method of claim 1, wherein the aqueous cleaning solution consists essentially of about 10 weight percent HF, about 2 weight percent $H_2O_2$, and water.

5. The method of claim 1, wherein the polycrystalline silicon fraction is contained in a container which has openings, further comprising immersing the container into the aqueous cleaning solution, the aqueous cleaning solution flowing through the openings into the container and wetting the polycrystalline silicon, then raising the container out of the aqueous cleaning solution until the aqueous cleaning solution flows out through the openings of the container.

6. The method of claim 1, wherein the method is carried out at standard pressure and room temperature.

7. The method of claim 1, wherein the yield of dried polycrystalline silicon based on the weight of impure polycrystalline silicon which has been cleaned, is about 99.9%.

8. The method of claim 1, wherein the maximum particle size of the silicon fragments is 10 min.

9. The method of claim 1, wherein the metal impurities of the dried polycrystalline silicon fraction is less than 10 ppbw.

10. The method of claim 1, where the metal impurities comprise Fe and Cr.

11. The method of claim 1, wherein the amount of HF present is 5 to 10 weight percent and the amount of $H_2O_2$ present is 1 to 2 weight percent.

12. The method of claim 1, wherein the aqueous cleaning solution consists of water, HF, and $H_2O_2$.

13. The method of claim 2, wherein the aqueous cleaning solution consists essentially of 10 weight percent HF, about 2 weight percent $H_2O_2$, and water.

14. The method of claim 13, wherein the aqueous cleaning solution consists essentially of about 10 weight percent HF, about 2 weight percent $H_2O_2$, and water.

15. The method of claim 5, wherein the polycrystalline silicon fraction in the container is immersed into the aqueous cleaning solution at least twice by means of a raising and lowering movement.

16. The method of claim 5, wherein the polycrystalline silicon fraction in the container executes a seesaw movement with from 1 to 10 movements per minute at an angle of from 5 to 89 degrees or a rotary movement with from 1 to 10 revolutions per minute.

17. The method of claim 15, wherein the container is a basket.

18. The method of claim 15, wherein the raising and lowering movements are configured so that the container can be fully emptied when it is raised out of the aqueous cleaning solution, the aqueous cleaning solution flowing out fully.

19. The method of claim 15, wherein the raising and lowering movement is carried out 5 times per minute for up to 240 minutes.

20. The method of claim 15, wherein the raising and lowering movement is carried out 5 times per minute for up to 40 minutes.

* * * * *

UNITED STATES PATENT AND TRADEMARK OFFICE
CERTIFICATE OF CORRECTION

PATENT NO. : 7,736,439 B2
APPLICATION NO. : 11/764246
DATED : June 15, 2010
INVENTOR(S) : Hanns Wochner et al.

Page 1 of 1

It is certified that error appears in the above-identified patent and that said Letters Patent is hereby corrected as shown below:

Column 5, Line 33, Claim 8:

Delete "10 min" and insert -- 10 mm --.

Signed and Sealed this

Thirty-first Day of August, 2010

David J. Kappos
*Director of the United States Patent and Trademark Office*